United States Patent Office 3,340,088
Patented Sept. 5, 1967

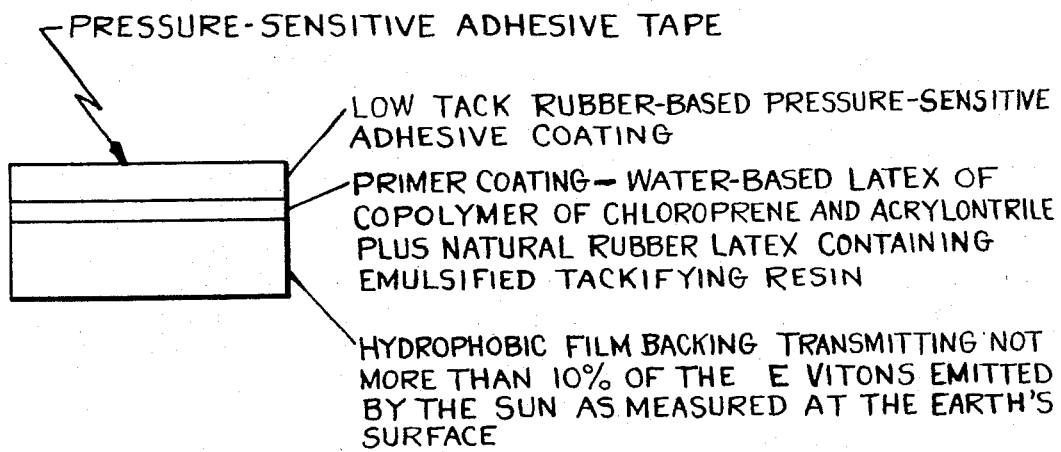

3,340,088
CHLOROPRENE-ACRYLONITRILE COPOLYMER PRIMER FOR PRESSURE-SENSITIVE ADHESIVE TAPE
Joseph V. Pennisi, Troy, and Charles S. Webber, Loudonville, N.Y., assignors to Norton Company, Troy, N.Y., a corporation of Massachusetts
Filed Aug. 11, 1964, Ser. No. 388,848
3 Claims. (Cl. 117—76)

ABSTRACT OF THE DISCLOSURE

A pressure-sensitive tape having as the primer coating to anchor a rubber-based adhesive to a hydrophobic film backing the dried deposition product of a water-based latex of a copolymer of chloroprene and acrylonitrile and a natural rubber latex containing an emulsified tackifying resin.

The present invention relates in general to pressure sensitive adhesive tapes and more particularly to such tapes especially adapted for use as a protection for polished metal surfaces.

It has become accepted practice to protect the polished surfaces of stainless steel, chromium plate, aluminum, nickel plate and similar metals from damage in storage or in transit by placing on such surface a so-called "protective tape." Generally, these protective tapes have utilized paper backings and have suffered from ultraviolet aging which has increased the tack of such adhesive tapes to the point that they are difficult to remove from the polished surface without tearing or delaminating. An additional drawback to the existing protective paper tapes has been that where the protected metal was to be formed into a manufactured item as by stamping or the like, defects in the metal could only be discovered by removing the protective paper prior to stamping and either replacing it or running the risk of marring the metal surface in the forming operation.

Accordingly, it is an object of the present invention to provide a protective tape which overcomes the disadvantages recited above.

Another object of the invention is the provision of a protective tape made on a transparent film backing.

A further object of the invention is the provision of an improved primer composition especially adapted for use with transparent hydrophobic films to serve to anchor hydrophobic adhesive compositions thereto.

Additional objects, if not specifically set forth herein, will be readily apparent to one skilled in the art from the following detailed description of the invention:

Generally, the present invention comprises the formation of an improved protective pressure sensitive adhesive tape utilizing as the backing member a hydrophobic film which is essentially opaque to the ultraviolet radiation level encountered at the earth's surface. More specifically, the film backing may be any hydrophobic film such as polyvinyl chloride, cellulose acetate, copolymers of ethylene and acrylates, polystyrene, polyester, polypropylene, polyethylene, or copolymer of ethylene and propylene, or the like, which is so compounded as to transmit no more than 10% of the E vitons emitted by the sun as measured at the earth's surface. To this film is bonded a primer composed of the dried deposition product of a water-based latex of a copolymer of acrylonitrile and chlorophene and a rubber latex containing an emulsified tackifying resin. Bonded to the film by this primer is a light tack pressure sensitive adhesive mass of the usual rubber-resin type. The drawing illustrates a cross-section of a tape made in accordance with the above.

In determining the type of film to be used in the tape, a transparent hydrophobic film is interposed between a General Electric Company RS1 sunlamp and a General Electric Company sunlamp tester with the meter of the tester held 10″ directly below the center of the lamp and reading 14.2 E vitons. If the transparent film cuts the reading down to 1.5 E vitons or less it is suitable for use in the present invention. So many possible variations of formulations and compounding are possible in film manufacture that defining the film as transparent to the extent that when placed on a surface written indicia is visible therethrough; as hydrophobic (which eliminates materials such as polyvinyl alcohols or cellophane); and as transmitting no more than 10% of the E vitons radiated by the sun as measured at the earth's surface, appears to be the only adequate description. A commercially available example of such a film is Vinylite VBA3300 (Union Carbide Plastics Division). The primer requires the presence as the main constituent (22% to 62% of the total solids weight) of a copolymer of chloroprene and acrylonitrile in the form of a water-base latex. The ratio of chloroprene to acrylonitrile is the copolymer may vary from 75:25 to 85:15 with a chloroprene:acrylonitrile ratio of 82:18 being preferred. A commercially available copolymer latex within this range is E. I. du Pont's Neoprene 450 latex. Suitable copolymers can be prepared as illustrated by the following example:

Example 1

The following proportions of ingredients were utilized to produce a chloroprene-acrylonitrile copolymer:

| | Pounds |
|---|---|
| Chloroprene | 88.5 |
| Acrylonitrile | 138 |
| Potassium persulfate | 2.83 |
| Sodium meta-bisulfate | 4.80 |
| Ferric chloride | .0001 |
| Formaldehyde/sodium naphthalenesulfonate | 8.4 |
| Water | 762 |

Phosphoric acid as required to a pH of 3.0–5.0.

Separate solutions of the potassium persulfate, sodium meta-bisulfate, formaldehyde/sodium naphthalenesulfonate and feric chloride in portions of the water were prepared for ease in addition to a glass-lined reactor maintained under a nitrogen atmosphere. Since the chloroprene is 22 times more reactive than the acrylonitrile, 50–75% of the latter was first added to the reactor and the chloroprene emulsified with 75% of the catalyst components and water. The balance of the acrylonitrile was added over a period of two hours after the start of the reaction which was maintained at 70–80° C. The reaction was carried on for two hours and the finished copolymer contained approximately 18 mol percent acrylonitrile. Stabilizers such as phenothiazine, phenyl beta napthylamine, N, N' diphenyl p-phenylene diamine in amounts of 1% to 2% by weight dispersed in a solvent are preferably added and emulsified with the formaldehyde sodium naphthenate condensation product.

The second component of the primer is a natural rubber latex containing a minor amount of an emulsified tackifying resin. The natural rubber latex is present in the primer in an amount varying from 63% to 34% by weight of the total solids content of the primer and contains from 15% to 4% by weight of the total solids content of the primer of an emulsified tackifying resin. The tackifying resin is not critical as to type and may include such diverse resin emulsions as those containing petroleum hydrocarbons (Piccopale Resins), terpene hydrocarbons (Newport "S" Resin) or wood rosin derivatives (Staybelite Resin or Tenex). The resin emulsions should, however, be either anionic or non-ionic so as not to coagulate the rubber latex and so that the latex can withstand the mechanical agitation of the tape coating operation. The finished primer must be capable of wetting out the surface of the film to which it is applied and not draw up into droplets on the surface to form an uneven or spotty coating.

The primer may be applied to the film by spray gun, roll coating, knife coating, reverse roll coating, transfer coating or by air knife to a weight in the range of 0.001 to 0.4 oz./sq. yd. but preferably to a weight within the range of 0.1 to 0.2 oz./sq. yd. The coated primer is then thoroughly dried in warm air to 100°–160° F.

As illustrative of primer compositions which may be used in the tape of the present invention, the following Table identified as Example 2 is furnished:

*Example 2*

|  | A | B | C | D | E | F | G |
|---|---|---|---|---|---|---|---|
| Neoprene Latex 450 (41%) | 100 | 100 | 200 | 300 | 100 | 100 | 100 |
| Creamed Rubber Latex (67½%) | 87.2 | 43.6 | 43.6 | 43.6 | 69.5 | 69.5 | 69.5 |
| Piccopale A20 (50%) [1] | 12 | 6 | 6 |  |  |  |  |
| Piccopale A1 (50%) |  |  |  | 6 |  |  |  |
| Piccolyte S70 (50%) |  |  |  |  |  |  | 12 |
| Tenex (in 28% NH$_4$OH) (10%) [2] |  |  |  |  | 27.5 |  |  |
| Staybelite Resin (in 28% NH$_4$OH) (10%) [3] |  |  |  |  |  | 27.5 |  |
| Antioxidants as required | 8 | 4 | 4 | 4 | 4 | 4 | 4 |

[1] Petroleum hydrocarbon (Pennsylvania Industrial Chemical Corp.).
[2] Heat-treated wood rosin (New Port Industries).
[3] Hydrogenated rosin (Hercules Powder Co.).

The pressure sensitive adhesive applied may be of any conventional rubber-resin formulation so long as the adhesion thereof to a metal surface is in the range of 1 to 3 oz./inch. The "build adhesion" or the adhesion after contact with the metal surface for a period of 16 hours at 150° F. and 50% R.H. should not exceed 12 oz./inch in order to perform satisfactorily as an easily removable protective material. A preferred version of the pressure sensitive adhesives which can be used in a simple rubber latex adhesive with or without a minor amount of a water-dispersed tackifying resin. A typical formulation for such an adhesive is:

|  | Pounds |
|---|---|
| Creamed natural rubber latex (67½% solids) | 148 |
| Piccopale A20 | 20 |
| Antioxidants | 13 |

The adhesive is coated by any suitable method to a weight within the range of 0.5 to 1.0 oz./sq. yd. (dry). The coated film is dried in a forced air oven at 150°–160° F. until thoroughly dry (10 to 15 min.). Because of the hydrophobic nature of the film the material may be rolled into roll form and stored for long periods of time and then easily unrolled without need for any release backsize treatment. Tests have indicated this ease of unrolling persists even after accelerated aging at 150° F. for 16 hours.

Film tapes made in accordance with this invention are competitive in cost with prior art paper tapes and outperform such tapes in practice. This tape permits storage of metal items protected therewith out-of-doors for reasonable periods of time without freezing of the tape to the metal substrate, without adhesive transfer to the metal substrate upon removal of the tape and without staining or discoloration of the metal surface.

We claim:
1. A pressure sensitive adhesive tape comprising:
   (a) a hydrophobic film backing;
   (b) a primer coating bonded to said film backing and formed of the dried deposition product of a water-based latex of a copolymer of chloroprene and acrylonitrile, the ratio of chloroprene to acrylonitrile being from 75:25 to 85:15, and a natural rubber latex containing an emulsified tackifying resin, said tackifying resin being from 15% to 4% by weight of the total solids content of the primer, said copolymer ranging from 22% to 62% of the total solids weight of said primer coating; and
   (c) a low-tack rubber-based pressure sensitive adhesive bonded to said primer coating.

2. A pressure-sensitive adhesive tape as in claim 1 wherein said hydrophobic film backing is transparent.

3. A pressure-sensitive adhesive tape as in claim 1 wherein said hydrophobic film backing transmits up to 10% of the E vitons emitted by the sun as measured at the earth's surface.

References Cited

UNITED STATES PATENTS

| 2,177,627 | 10/1939 | Drew | 117—76 |
| 2,576,148 | 11/1951 | Schechtman | 117—122 |
| 2,593,681 | 4/1952 | Leydon | 260—33.6 |
| 2,647,843 | 8/1953 | Bemmels | 117—76 |
| 2,795,515 | 6/1957 | Lavanchy | 117—72 |
| 2,927,868 | 3/1960 | Revoir | 117—76 |
| 3,028,259 | 4/1962 | Webber | 117—76 |
| 3,078,182 | 2/1963 | Crone et al. | 117—68.5 |
| 3,079,359 | 2/1963 | Stierli | 260—29.7 |
| 3,092,250 | 6/1963 | Knutson et al. | 206—59 |
| 3,223,661 | 12/1965 | Bond | 260—23 |

WILLIAM D. MARTIN, *Primary Examiner.*

W. D. HERRICK, *Assistant Examiner.*